Sept. 23, 1941.    H. A. BAKKE    2,256,464
THERMAL DEMAND METER RESET
Filed Jan. 4, 1941
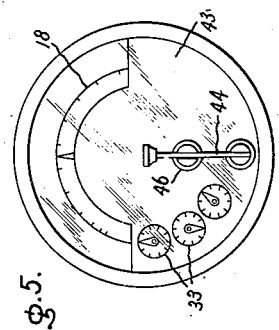
Fig.5.
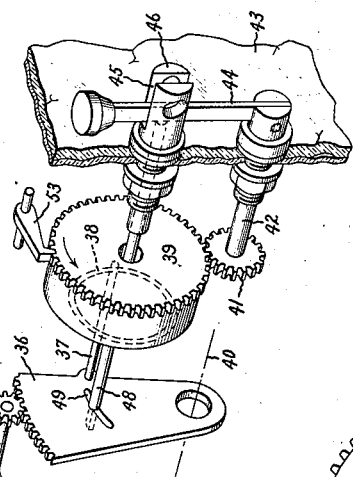
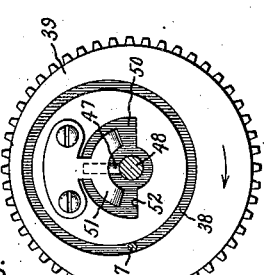
Fig.3.
Fig.4.
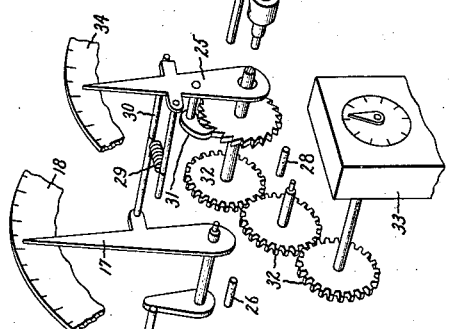
Fig.1.
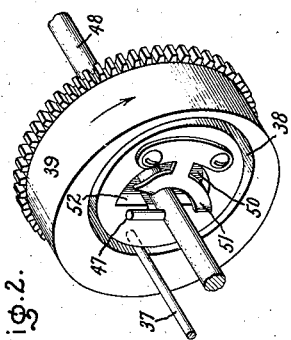
Fig.2.
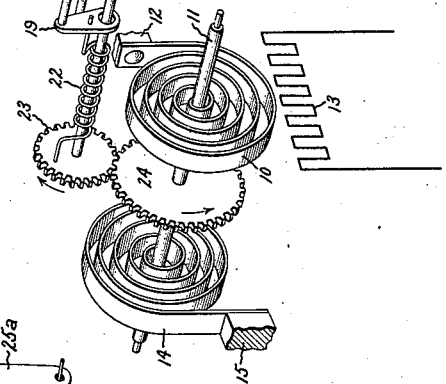
Fig.6.
Inventor:
Hans A. Bakke,
by Harry E. Dunham
His Attorney.

Patented Sept. 23, 1941

2,256,464

UNITED STATES PATENT OFFICE 2,256,464

THERMAL DEMAND METER RESET

Hans A. Bakke, Swampscott, Mass., assignor to General Electric Company, a corporation of New York Application January 4, 1941, Serial No. 373,114

8 Claims. (Cl. 171—34)

My invention relates to the resetting mechanism of demand meters and is particularly useful on demand meters of the thermal type where it is desirable to add the maximum demand reading to an accumulative register when the maximum demand pointer is reset.

The features of my invention which are believed to be novel and patentable will be pointed out in the claims appended hereto. For a better understanding of my invention reference is made in the following description to the accompanying drawing in which Fig. 1 represents an exploded perspective view of a preferred modification of my invention; Figs. 2 and 3 are rear views taken at different angles of the resetting cam shown at 39 in Fig. 1; Fig. 4 is a double scale and pointer representation explanatory of my invention; Fig. 5 represents a face view of a thermal demand meter to which my invention has been applied; and Fig. 6 shows a form of variable ratio transmission between a friction pointer and integrator member that might be used in Fig. 1 where a certain form of nonuniformity in scale distribution is encountered.

In Fig. 1, 10 represents a bimetal spiral having its inner end secured to a shaft 11 and its outer end secured to a stationary support 12. This spiral is shown associated with a heater resistance 13 by means of which the spiral may be heated when an electric current is passed through the heater. Heating of the spiral causes it to expand or uncoil and thereby turns the shaft 11 in a counter-clockwise direction to an extent proportional to the heating. A second bimetal spiral 14 has its inner end secured to the same shaft 11 and its outer end secured to a stationary support 15. It is spiraled about shaft 11 in a direction opposite to that of spiral 10 and has no heater element associated with it. The purpose of spiral 14 is to oppose and compensate that torque of spiral 10 which may be due to ambient temperature changes and not due to current flow through heater 10. By suitable lagging and heat insulation enclosures not shown, such a device may be used to measure the current flow in a circuit, which current flow may be made proportional to some quantity which it is desired to measure. My invention is not concerned with the details of the thermal responsive element just described and it may be taken to represent any one of a variety of such devices for turning the shaft 11 in response to some measurement.

Fig. 1 also shows a demand pointer 17 cooperating with a scale 18 which has for its purpose measuring and indicating the maximum demand of the measuring element. For this purpose a dog 19 is provided for moving pointer 17 up-scale in a clockwise direction in accordance with the measurement deflection or rotation of shaft 11. Dog 19 is free to turn on a shaft 20 but is urged against a stop 21 secured to shaft 20 by a spiral spring 22 secured between the dog 19 and the gear wheel 23, the latter being fastened on shaft 20, and geared with a gear 24 fastened to shaft 11 of the thermal measuring element.

The pointer 17 is shown coupled to a second pointer 25, the purpose of which will be explained presently. The pointer assembly 17—25 moves up-scale in response to measurements as a unit and has sufficient friction to remain at the highest deflection reached until forcibly reset. The force necessary to move the pointer assembly up-scale is small because only friction is involved. Hence during such movements the dog driving assembly consisting of gear 23, shaft 20, stop 21, spring 22 and the dog 19 rotates as a rigid unit with the dog arm resting firmly against stop 21 and with the spring 22 under some tension. The dog 19 is therefore normally always positioned through gears 23 and 24 in accordance with the measurement condition of the measuring element.

When the friction pointer 17 is reset manually it is always reset to a zero position against a stop 26 even though the dog 19 may have some measurement position above zero. The spring 22 allows rotation of the dog 19 to a zero position independently of stop 21 and as soon as the resetting force has been removed spring 22 again rotates dog 19 against stop 21 to advance the pointer 17 to a correct measurement position. In such resetting operation there may also be some slight rotation of shaft 11 due to the resiliency of the spirals 10 and 14, but as soon as the resetting pressure is removed shaft 11 returns to a true measurement position and stop 21, dog 19 and pointer 17 are positioned accordingly.

If, after a manual resetting operation of pointer 17 against zero stop 26, the pointer should suddenly be released, the probability is that dog 19 would snap upward against stop 21 and in so doing throw pointer 17 up-scale beyond a true measurement position. This, however, is prevented by the use of a manual resetting means which requires the dog 19 to return against stop 21 in a gradual manner instead of by a snap action.

The manual resetting means includes a crank 27 mounted for rotation about the same axis as that of pointers 17 and 25 and which normally rests in the position shown slightly beyond the maximum up-scale position of pointer 25. Rotation of crank 27 counter-clockwise moves pointers 25 and 17 as a unit counter-clockwise down scale until pointer 17 strikes stop 26. Then crank 27 moves pointer 25 further in a counter-clockwise direction until it strikes a stop 28. This independent movement of pointer 25 is possible by reason of the spring connection shown at 29 between the pointers tending to hold them together with pointer 25 resting against a stop 30 which projects forward from pointer 17. When pointer 25 is thus reset against its stop 28 a ratchet 31 thereon drives a gear train 32 for operating a register 33 which thus accumulates and integrates the various maximum demand readings. If the deflection characteristics of a thermal element such as shown at 10 was such as to produce a uniform scale it would be unnecessary to provide the separate ratchet operating member 25 for accumulating purposes. In such case the ratchet 31 could be operated by pointer 17. However, it is practically impossible to have a uniform scale for pointer 17 due to various factors that need not be fully analyzed here. In general it may be pointed out that the heating of heater 18 is proportional to the square of the current flow therethrough and that the resultant temperature rise of spiral 10 depends upon an increasing heat loss with rise in temperature so that the lower end of scale 18 approaches the crowded condition shown on scale 18 in Fig. 4 where pointer 17 is shown in its zero indicating position. The graduations of scale 18 are not uniform at the lower one-third end and do not become uniform until graduation 3 is reached. Beyond this point and over the upper two-thirds of the scale it is generally possible to make the scale graduations uniform with a thermal type of measuring element, the scale graduations corresponding to the magnitude of current flow in heater 13.

In Fig. 4 I have shown a second scale 34 for pointer 25 having uniform graduations corresponding in uniformity to the uniform portion of scale 18, i. e. from graduation 3 upward the scales are alike. Pointer 25 is shown in its zero indicating position with respect to its uniform scale 34.

It is now seen that if we had a maximum demand reading of 3 or above on the scales, such demand reading would not be correctly accumulated on register 33 merely by setting pointer 25 back to the zero position of pointer 17 because the gear train 32 is a constant ratio gear train and does not conform to the variable deflection characteristics of pointer 17 over the lower portion of its scale. It is necessary to visualize the suppressed zero scale 34 and reset pointer 25 back to zero on this uniform scale in order to correctly accumulate the maximum demand reading on register 33. In Fig. 4 the two pointers 17 and 25 are represented at their zero positions against their stops 26 and 28 with the spring 29 stretched as in a resetting operation. It is not intended to imply that all thermal demand meters will have scales 18 and 34 exactly as represented in Fig. 4. The non-uniform portion of the scale 18 will vary somewhat with different thermal meter designs and the zero stops will need to be positioned accordingly to accomplish correct accumulation on registers such as 33 but the general principles here explained may be applied.

The nature of the connection between the maximum demand pointer 17 and the integrator member 25 will depend in any case on the nature and degree of non-uniformity of the demand meter scale. If, for example, the characteristics of the meter element are such as to require a scale which is crowded at both its upper and lower ends and the crowding is greatest at its upper end, a pin and slot coupling such as is shown in Fig. 6 may be used. Here 17a and 25a correspond to the pointers 17 and 25 of Fig. 1. The pivot of pointer 25a is, however, somewhat below that of pointer 17a so that we have a variable transmission ratio of movement between the pointers over the deflection range. In Fig. 6 the pointers are assumed to be in the center of their deflection range. If the slot in pointer 25a was radial and straight the transmission ratio would be symmetrical with respect to the center of the scale which is assumed to correspond to the indication of the pointers when they are parallel as shown. However, the slot is shown canted in a direction to increase the movement of pointer 25a with respect to pointer 17a at the upper end of the scale as compared to the lower end of the scale. The direction and nature of curvature of the slot if any and the spacing of the pointer pivots will vary depending upon the results desired. This form of transmission will correctly integrate demand measurements from any point on the scale if the transmission ratio varies to correspond to the non-uniformity in the demand meter scale graduations.

Another fact that needs to be observed in connection with Fig. 1 is that if the demand reading is much less than 3 on the scale 18 when a resetting operation occurs the accumulation on register 33 will not be correct. Suppose that the demand reading on scale 18 is 1 and the pointers are reset, the accumulation on register 33 will not be correct but will be too great, because in such case resetting pointer 25 to zero from the position of pointer 17 will accumulate a demand reading of nearly 2 on scale 34. Hence to obtain correct accumulating results with the form of connection shown in Fig. 1 the demand meter should not be reset to zero when the demand reading is on the lower non-uniform portion of the scale. This is not considered to be an inconvenience because such demand readings are of no interest and are not the kind of demand readings for which the meter is intended and will rarely ever occur and if they do occur the meter reader will note the fact and omit the resetting operation.

It will be understood that Fig. 4 is an explanatory diagram and that ordinarily the pointer end of accumulating lever member 25 which has been referred to as a pointer and the suppressed zero uniform scale 34 can be omitted as indicated in Fig. 5. If no accumulation of the maximum demand readings are desired the members 25, 28, 29, 30, 31, 32 and 33 of Fig. 1 can be omitted and the resetting pusher or crank 27 arranged to operate directly on pointer 17.

Crank 27 is on a shaft with a gear 35 which gear meshes with a geared sector 36. Sector 36 is oscillated about an axis 40 back and forth through a small angle sufficient to accomplish resetting by means of an eccentric cam consisting of a pin 37 extending from sector 36 and riding in an eccentric groove 38 in the rear face of a thick gear wheel 39. Gear wheel 39 is rotated from a smaller gear 41 on a shaft 42 which extends through the front cover 43 of the meter and has a bearing therein. On its front end shaft 42 has a hinged lever 44 by means of which the shaft may be manually rotated for resetting purposes. When not in use the lever 44 is pushed into a slot 45 of a sealing stud 46 and the lever sealed in place by passing a sealing wire through the openings in the seal pin over the lever 44. In the illustration a three to one gear ratio is used and lever 44 is rotated three complete revolutions in a clockwise direction to perform a resetting operation. This rotates gear 38 one complete revolution in a counter-clockwise direction and oscillates resetting lever 27 through the necessary resetting angle which is sufficient to reset pointer 25 against its stop 38 from any up-scale position. Such resetting action operates the register 33 and moves pointer 17 against its zero stop 26. It is evident that the oscillation of resetting lever 27 is slow enough when lever 44 is manually operated to allow the pointers 25 and 17 to return up-scale to the true measurement position of dog 21 without overshooting.

The resetting gear 39 and associated parts are preferably so arranged as to require an exact resetting operation and an exact return of levers 27 and 44 to the positions shown in the drawing. To this end I have provided an axial rod 48, having a lock pin 47 thereon, through the center of gear 39 and which rod also enters through an axial bore in sealing stud 46. The rear end of rod 48 is squared and enters a slot 49 in gear sector 36 which serves to keep the rod 48 from turning and the lock pin 47 in the upright position indicated in Figs. 2 and 3. Rod 48 is freely slidable endwise to a limited extent in order that lock pin 47 may enter and be removed from a recess 50 in the rear face of gear 39. Following a resetting operation rod 48 is moved to the rear to move pin 47 out of recess 50 when the manual lever 44 is shoved into slot 45 of stud 46 to sealing position, as shown in Fig. 1. In this operation lever 44 comes against the forward end of rod 48 and moves it to the rear as lever 44 is seated into the slot. Rod 48 is moved to the front to bring pin 47 into recess 50 during the last portion of a resetting operation by means of a cam finger 51 which is secured to the rear face of gear cam 39 and rotates with it.

The cavity 50 has a radial surface 52 facing in the direction in which the gear cam rotates during a resetting operation. The rotary position of gear cam 39 with respect to lock pin 47 in the normal idle sealed position of the resetting device represented in Fig. 1 is that represented in Fig. 2. At the end of a resetting operation when the resetting pusher 27 has returned to its normal idle position, and before lever 44 is shoved into sealing slot 45, pin 47 rests against face 52 of the cavity and serves to stop rotation of gear cam 39 in this position. When lever 44 is shoved into slot 45, rod 48 is moved to the rear to remove pin 47 from the locking slot 50 and the pin then takes the position shown in Fig. 2. During a resetting operation cam gear rotates counterclockwise, (clockwise as viewed in Fig. 2) and after making approximately ½ revolution the rearwardly extending tip of cam finger 51 engages the rear edge of stop pin 47 and during the remaining portion of the complete revolution of cam gear 39 pin 47 is drawn into the cavity 50 by cam finger 51. The condition of affairs after three-quarters of a revolution of the cam gear 39 is shown in Fig. 3. At the end of the resetting operation when the cam gear has made exactly one complete revolution, face 52 comes against pin 47 and the resetting operation is stopped at the desired point. The lever 44 is now lined up with slot 45 and the operator cannot rotate it further until he shoves it into sealing position to thereby remove the lock on cam gear 39. A stop pawl 53 is preferably provided to prevent any backward rotation of cam gear 39 and lever 44.

While it would do no harm to reset pointer 17 to zero position more than once at one resetting period, any over operation of the resetting device would result in over accumulation on register 33 since at the end of a resetting operation pointers 17 and 25 may immediately advance to any position on the scales determined by the then thermal condition of the thermal element 10. The stop 52—47 described prevents accidental improper over-operation of the resetting mechanism, and stops the operation at a point such as to allow lever 44 to reenter slot 45 after one complete revolution of gear cam 39, and with lever 27 in the normal idle position out of the way of any likely measurement advance of the pointer assembly 17—25.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A demand meter comprising friction pointer means pivoted to swing through a measurement arc, a movable pointer advancing dog positioned to contact said pointer means on one side and advance it towards a maximum measurement position, a resetting pusher normally positioned on the other side of said pointer means beyond the maximum measurement position thereof and movable to return the friction pointer from a maximum to a zero measurement position, a movable measurement responsive device continuously urging said dog to a position corresponding to a measurement, if any, and effective to advance said friction pointer means accordingly, and manual means including an eccentric rotatable through a complete revolution to operate said resetting pusher to reset said pointer means and dog to a zero measurement position and allowing the return of the pointer means and the pusher to an up-scale position, said return, if any, being sufficiently gradual as to allow the dog, when urged by said measurement device, to advance the friction pointer means to current measurement position without overshooting.

2. A thermal demand meter comprising friction pointer means pivoted to swing through a measurement arc, a movable pointer advancing dog positioned to contact said pointer means on one side and advance it towards a maximum measurement position, a resetting pusher normally positioned on the other side of said pointer means beyond the maximum measurement position thereof, and movable to return the friction pointer means from a maximum to a zero measurement position, thermal measurement means resiliently positioning said dog in accordance with a thermal measurement condition and effective to advance said friction pointer means accordingly, and manual means including an eccentric rotatable through a complete revolution to operate said resetting pusher to reset said pointer means and dog to a minimum measurement position and return the pusher to normal position, said return being sufficiently gradual as to allow the dog to advance the friction pointer means to the then thermal measurement position without overshooting.

3. In a demand meter a friction pointer, a scale on which said pointer indicates, a dog for advancing said pointer in an up-scale direction, a zero stop for said pointer, manual means for returning said friction pointer down scale against said stop, a shaft rotated in response to a measurement, said shaft, the friction pointer and the dog all having the same axis of rotation, a stop on said shaft and a spring secured between said shaft and dog for resiliently biasing said dog against said stop in an up-scale direction with sufficient force to move the friction pointer up-scale in response to rotary measurement movements of said shaft with the dog in contact with said stop, the arrangement permitting the return of said friction pointer and dog to zero positions independently of a corresponding rotary movement of said shaft.

4. In a demand meter, a scale, a friction pointer indicating on said scale, a dog for advancing said pointer in an up-scale direction in response to a measurement, a measuring device for advancing said dog, said measuring device having such characteristics as to necessitate a crowded non-uniform scale distribution at the lower end of the scale and a uniform upper scale distribution, a zero stop for said friction pointer, manual resetting means for returning said pointer downscale to a zero indicating position against said stop, and means operated in response to the manual resetting operations of said demand meter for integrating the maximum demand measurements comprising a register and constant ratio driving means for said register which normally moves in unison with said friction pointer but which has a resilient lost motion connection therewith and a down-scale movement beyond the zero stop of said pointer a distance sufficient to compensate for the aforesaid crowded scale distribution and to correctly integrate the maximum demand measurements.

5. In a demand meter a friction pointer, a non-uniform scale on which said pointer indicates, a dog for advancing said pointer up-scale in accordance with the demand to be measured, a measuring device for advancing said dog, the characteristics of said meter being such as to require a non-uniform scale distribution conforming to the scale used, a zero stop for said pointer, register means for integrating the maximum demand measurement readings, and resetting means for driving said friction pointer down-scale against its stop and for driving said register means to correctly integrate the maximum demand reading at the end of maximum demand measurement periods, said resetting means causing movements of said pointer and register means which differ to the extent necessary to compensate for the non-uniformity of the demand meter scale.

6. In a maximum demand meter, a resetting mechanism therefor including a rotary resetting member which is arranged to make exactly one complete revolution in a given direction in performing a resetting operation and returning to normal idle position, manual means for turning said rotary resetting member, means for sealing said manual means when the rotary member is in idle position, said sealing means including a stud having an axial slot in one end and axially aligned with said rotary member and adapted to receive the manual means in the slot thereof for sealing purposes, a rod extending axially between said stud and rotary member, said rod being held from rotation but movable endwise between locking and unlocking positions, means on said rod and rotary member for locking the latter against rotation in a resetting direction when in its idle rotary position and the rod is in locking endwise position, the rod being arranged to be moved from locking position to unlocking position by movement of said manual means to sealing position, and means carried by said rotary member for moving said rod from unlocking to locking position when the rotary member is rotated in performing a resetting operation.

7. In a maximum demand meter, a resetting mechanism including a rotary member adapted to make exactly one complete revolution in a given direction to perform a resetting operation and return to idle position, a cover for the meter inclosing said rotary member, a shaft extending through said cover and geared to said rotary member and having an external manual operating lever hinged thereto for operating the resetting mechanism, a stud extending through said cover in line with the rotary member and having an external recess into which the manual lever may be inserted and sealed when the rotary member is in idle rotary position, a stop movable to and from stopping position for stopping the rotary member in its idle position, cam means operated by said rotary member during a resetting operation for moving said stop to stopping position, and means operated by the movement of said manual lever to sealing position for moving said stop from stopping position.

8. A maximum demand meter comprising a friction pointer, a non-uniform scale with which said pointer cooperates, a dog for advancing said pointer up-scale, a measuring device for positioning said dog in accordance with a measurement, a resilient connection between said dog and measuring device permitting movement of said dog to a zero measuring position independently of a corresponding movement of the measuring device, resetting means for resetting said friction pointer and dog to zero positions and allowing them to return up-scale to a measurement position sufficiently gradually as to prevent an over-advance of the friction pointer, and a register for integrating the several maximum demand readings of said pointer operated by said resetting means during resetting operations.

HANS A. BAKKE.